(12) United States Patent
Chae et al.

(10) Patent No.: US 10,203,739 B2
(45) Date of Patent: Feb. 12, 2019

(54) ELECTRONIC DEVICE FOR CONTROLLING POWER AND METHOD THEREFOR

(71) Applicant: Samsung Electronics Co., Ltd., Gyeonggi-do (KR)

(72) Inventors: Sang-Won Chae, Seoul (KR); Hyoung-Il Kim, Gyeonggi-do (KR); Jung-Eun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/914,083

(22) PCT Filed: Aug. 6, 2014

(86) PCT No.: PCT/KR2014/007267
§ 371 (c)(1),
(2) Date: Feb. 24, 2016

(87) PCT Pub. No.: WO2015/030385
PCT Pub. Date: Mar. 5, 2015

(65) Prior Publication Data
US 2016/0209906 A1 Jul. 21, 2016

(30) Foreign Application Priority Data

Aug. 29, 2013 (KR) .................. 10-2013-0103341
Jun. 30, 2014 (KR) .................. 10-2014-0081006

(51) Int. Cl.
*G06F 1/26* (2006.01)
*G06F 1/32* (2006.01)
(Continued)

(52) U.S. Cl.
CPC .............. *G06F 1/3206* (2013.01); *G06F 1/26* (2013.01); *G06F 1/329* (2013.01); *G06F 1/3212* (2013.01);
(Continued)

(58) Field of Classification Search
None
See application file for complete search history.

(56) References Cited

U.S. PATENT DOCUMENTS 8,397,087 B1 * 3/2013 Gardner .................. G06F 1/329
713/300
8,645,728 B2 * 2/2014 Herdrich ............... G06F 1/3203
712/28
(Continued)

FOREIGN PATENT DOCUMENTS

CN 1399772 A 2/2003
CN 102096459 A 6/2011
(Continued)

OTHER PUBLICATIONS

European Search Report dated Mar. 28, 2017.
Chinese Search Report dated Nov. 28, 2017.
Chinese Search Report dated Jul. 25, 2018.

*Primary Examiner* — Ji H Bae
(74) *Attorney, Agent, or Firm* — Cha & Reiter, LLC

(57) ABSTRACT

An embodiment of the present invention relates to a device and a method for controlling power in an electronic device. The method for controlling power comprises an operation for determining a power consumption level necessary for the execution of a program in response to an execution input of the program, and an operation for executing the program on the basis of the power consumption level. Various other embodiments are also possible.

24 Claims, 20 Drawing Sheets

(51) Int. Cl.
  *G06F 9/50* (2006.01)
  *G06F 11/30* (2006.01)
(52) U.S. Cl.
  CPC .......... *G06F 1/3228* (2013.01); *G06F 1/3234* (2013.01); *G06F 9/5094* (2013.01); *G06F 11/3017* (2013.01); *Y02D 10/24* (2018.01)

(56) References Cited

U.S. PATENT DOCUMENTS

| | | |
|---|---|---|
| 2005/0017994 A1 | 1/2005 | Oh |
| 2007/0252552 A1 | 11/2007 | Walrath |
| 2008/0055318 A1 | 3/2008 | Glen |
| 2008/0141049 A1* | 6/2008 | Hassan ................ G06F 1/3203 713/320 |
| 2008/0189562 A1* | 8/2008 | McBrearty ............. G06F 1/206 713/300 |
| 2009/0218957 A1* | 9/2009 | Kraft .................... G06F 1/3203 315/291 |
| 2010/0048139 A1 | 2/2010 | Seo et al. |
| 2011/0209093 A1 | 8/2011 | Hinckley et al. |
| 2011/0283296 A1* | 11/2011 | Chun ................ H04M 1/72522 719/318 |
| 2012/0047379 A1* | 2/2012 | Chen ..................... G06F 1/3212 713/320 |
| 2012/0233480 A1 | 9/2012 | Tanaka |
| 2012/0304106 A1* | 11/2012 | LeVee .................. G06F 3/0481 715/781 |
| 2013/0080807 A1 | 3/2013 | Theocharous et al. |
| 2014/0108995 A1* | 4/2014 | Sandler ................ G06F 3/0481 715/781 |
| 2014/0176415 A1* | 6/2014 | Buuck .................... G06F 3/016 345/156 |
| 2014/0359324 A1* | 12/2014 | Park ........................ G09G 5/00 713/320 |

FOREIGN PATENT DOCUMENTS

| | | |
|---|---|---|
| CN | 102207788 A | 10/2011 |
| CN | 103080870 A | 5/2013 |
| EP | 1 672 466 A1 | 6/2006 |
| KR | 10-2007-0036507 A | 4/2007 |
| KR | 10-2011-0070046 A | 6/2011 |

* cited by examiner

ELECTRONIC DEVICE FOR CONTROLLING POWER AND METHOD THEREFOR

CLAIM OF PRIORITY

This application is a National Phase Entry of PCT International Application No. PCT/KR2014/007267, which was filed on Aug. 6, 2014, and claims a priority to Korean Patent Application No. 10-2014-0081006, filed on Jun. 30, 2014 which in turn claims a priority to an earlier Korean Patent Application No. 10-2013-0103341 filed on Aug. 29, 2013, the contents of which are incorporated herein by reference.

TECHNICAL FIELD

An embodiment of the present invention relates to a device and method for controlling power in an electronic device.

BACKGROUND ART

With the development of information and communication technologies and semiconductor technologies, an electronic device provides various multimedia services to users by using various application programs.

Portable electronic devices such as a smart phone, a tablet personal computer (a tablet PC), and a mobile phone use a limited battery capacity in consideration of the portability.

DETAILED DESCRIPTION OF THE INVENTION

Technical Problem

Accordingly, the portable electronic device uses a limited battery capacity so that users have inconvenience when using the electronic device.

An embodiment of the present invention may provide a device and method for reducing power consumption in a portable electronic device.

An embodiment of the present invention may provide a device and method for applying a different power consumption policy for each application program in a portable electronic device.

An embodiment of the present invention may provide a device and method for applying a different power consumption level for driving an application program according to the battery remaining capacity for each application program in a portable electronic device.

An embodiment of the present invention may provide a device and method for reducing power consumption according to an application program based on a power consumption level of the application program determined by a user in the portable electronic device.

Technical Solution

According to an embodiment of the present invention, an electronic device may include an input unit, a display, a battery, and a processor that determines a power consumption level required for executing a program in response to an execution input of the program, and executes the program on the basis of the power consumption level.

Advantageous Effects

The present invention may apply a different power policy for each application program in the electronic device, as described above, so as to reduce the power consumption for an application program that does not require a high power use, and to increase a power use for an application requiring a high power, thereby increasing battery use efficiency.

MODE FOR CARRYING OUT THE INVENTION

Hereinafter, various embodiments of the present invention will be described in detail with reference to the accompanying drawings. Further, in the following description of the present invention, a detailed description of known functions and configurations incorporated herein will be omitted when it may make the subject matter of the present invention rather unclear. The terms which will be described below are terms defined in consideration of the functions in the present invention, and may be different according to users, intentions of the users, or customs. Therefore, the definition should be made based on the overall contents of the present specification.

Hereinafter, an embodiment of the present invention may describe techniques for controlling power of an application program in an electronic device.

Hereinafter, an electronic device according to an embodiment of the present invention may include at least one of: a smartphone requiring power control, a tablet PC, a mobile phone, a videophone, an e-book reader, a desktop PC, a laptop PC, a netbook computer, a PDA (personal digital assistant), a PMP (portable multimedia player), an MP3 player, an accessory, an electronic appcessory, a camera, a wearable device, a wrist watch, a TV, a DVD (digital video disk) player, an audio, an electronic bracelet, an electronic necklace, an air purifier, an electronic picture frame, a medical device, a navigation device, a satellite signal receiver, an EDR (event data recorder), an FDR (flight data recorder), a set-top box, a TV box, an electronic dictionary, a car infotainment device, electronic equipment for ship, avionics, a security device, electronic clothing, an electronic key, a camcorder, a game console, a HMD (head-mounted display), a flat panel display device, and an electronic album. Further, it will be apparent to those skilled in the art that the electronic device according to the present invention is not limited to the above-mentioned devices.

Figure 1:
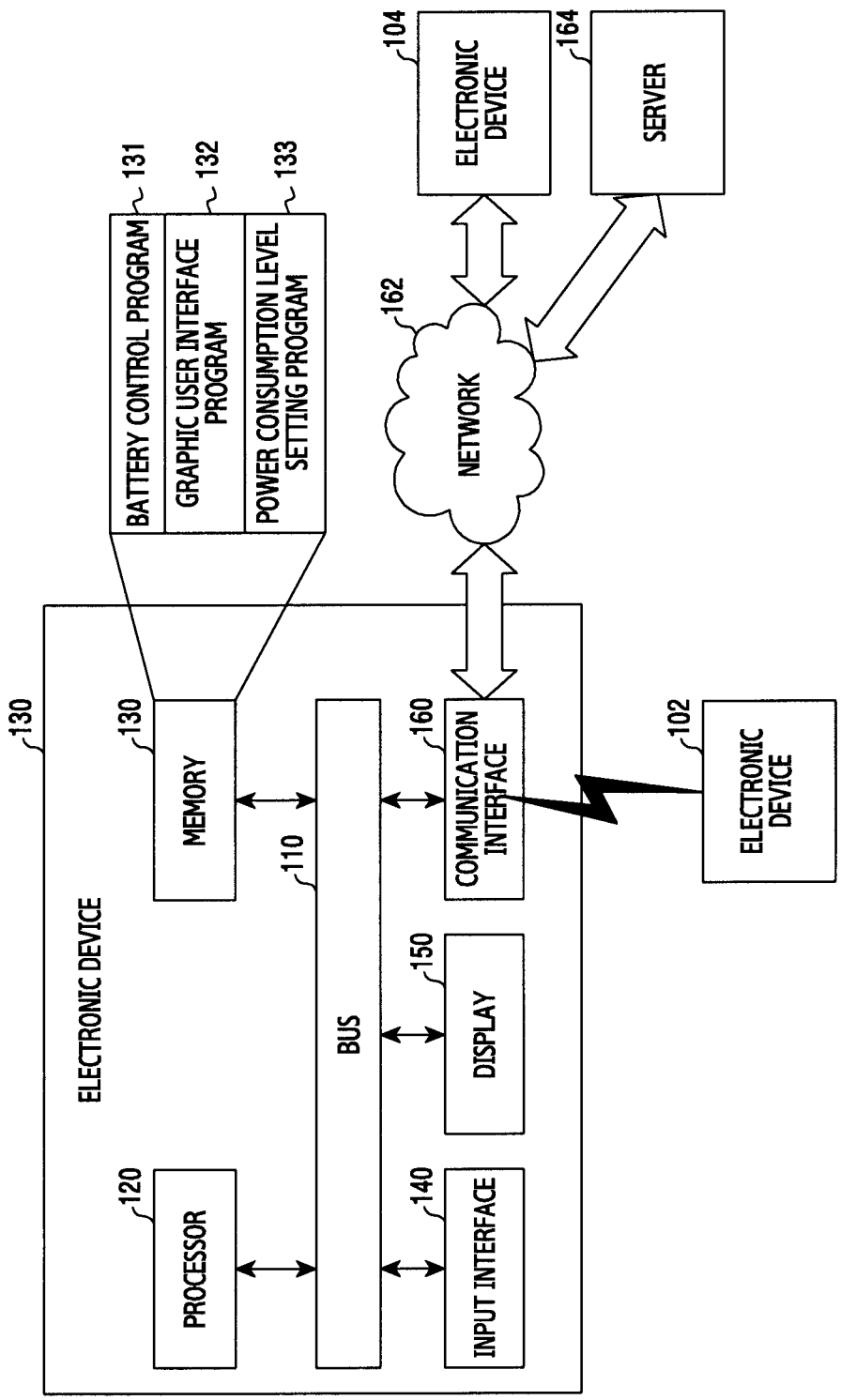
FIG. 1 is a block diagram of an electronic device according to an embodiment of the present invention.

FIG. 1 is a diagram showing a block configuration of an electronic device according to an embodiment of the present invention.

Referring to FIG. 1, the electronic device 100 may include a bus 110, a processor 120, a memory 130, a input interface 140, a display 150, and a communication interface 160. Here, at least one of the processor 120 or memory 130 may exist in multiple pieces.

The bus 110 may connect elements included in the electronic device 100 with each other, and control a communication between the elements included in the electronic device 100.

The processor 120 may control the electronic device 100 so as to provide various services. For example, the processor 120 may decode a command received from one or more other elements (for example, the memory 130, the input interface 140, the display 150, or the communication interface 160) included in the electronic device 100 through the bus 110, and execute an operation or data processing based on the decoded command.

The processor 120 may execute one or more programs stored in the memory 130 so as to control the electronic device 100 to provide various services. The processor 120 may execute a battery control program 131 stored in the memory 130 so as to determine a power consumption policy for each application program. For example, when power consumption policies for one or more application programs are set to an automatic control mode, the processor 120 may determine a power consumption level to be used for driving each application program based on a battery remaining capacity. At this time, the processor 120 may determine a power consumption level for each application program corresponding to the battery remaining capacity by using a power consumption level table for each application program stored in the memory 130. For another example, when power consumption policies for one or more application programs are set to an automatic control mode, the processor 120 may determine a power consumption level to be used for driving each application program based on a battery remaining capacity of the electronic device 100 from the time point at which the battery remaining capacity of the electronic device 100 is smaller than a reference battery remaining capacity. For still another example, when power consumption policies for one or more application programs are set to a user control mode, the processor 120 may determine a power consumption level to be used for driving each application program based on input information provided by a user.

According to various embodiments of the present invention, the processor 120 may control the driving of the application program based on the power consumption policy for each application program. Specifically, the processor 120 may limit at least one of performance (for example, maximum performance) for an operation or data processing of the processor 120 or a haptic function, according to the power consumption policy for each application program. In addition, the processor 120 may control application program information to be displayed on the display 150 based on the power consumption policy for each application program by executing a graphic user interface program 132 stored in memory 130. For example, the processor 120 may adjust the number of frames (FPS: frame per second) that is used to drive the application program in response to a power consumption level of an application program determined by using a battery control program 131. For another example, the processor 120 may adjust a resolution of the application program in response to the power consumption level of the application program determined using the battery control program 131. For still another example, the processor 120 may adjust at least one among a color palette quantization bit level (color depth), a bit quantization level (bit) of an audio signal, or an audio output level used to drive the application program in response to the power consumption level of the application program determined using the battery control program 131. For still another example, the processor 120 may adjust the brightness of the application program in response to the power consumption level of the application program determined using the battery control program 131. For still another example, the processor 120 may limit performance for graphic work so as to correspond to the power consumption level of the application program determined using the battery control program 131.

Figure 5A:
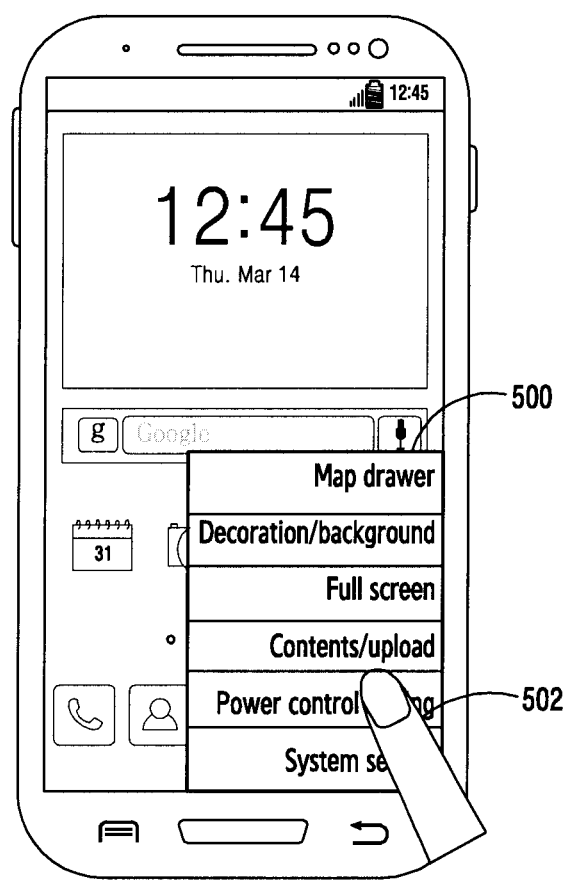
FIGS. 5A to 5E show screen configurations for determining a power consumption level of an application program in an electronic device according to an embodiment of the present invention.
Figure 5B:
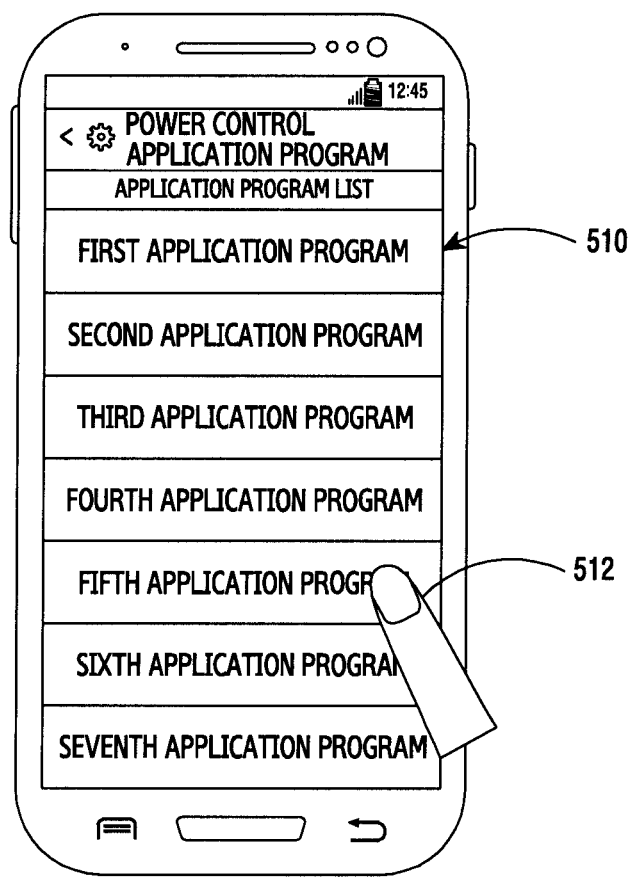
Figure 5C:
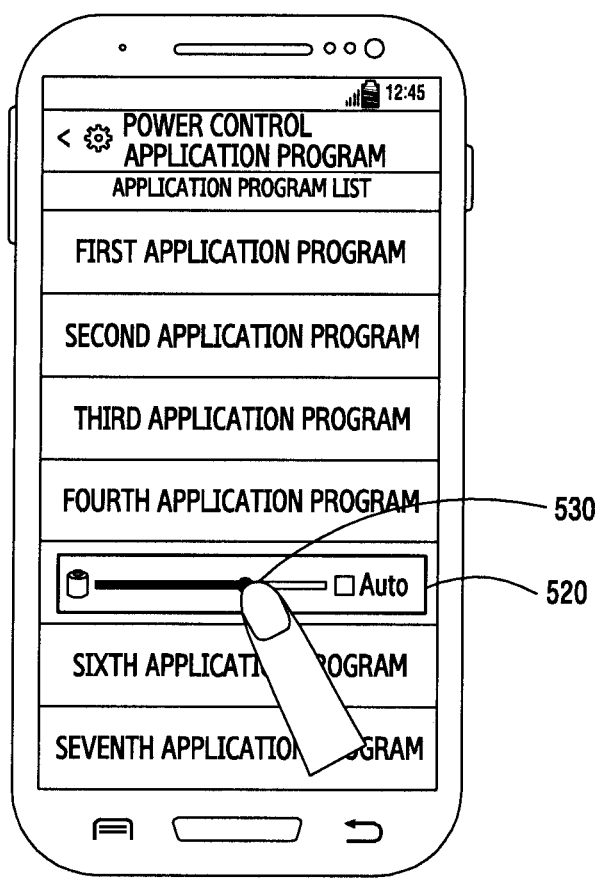
Figure 5D:
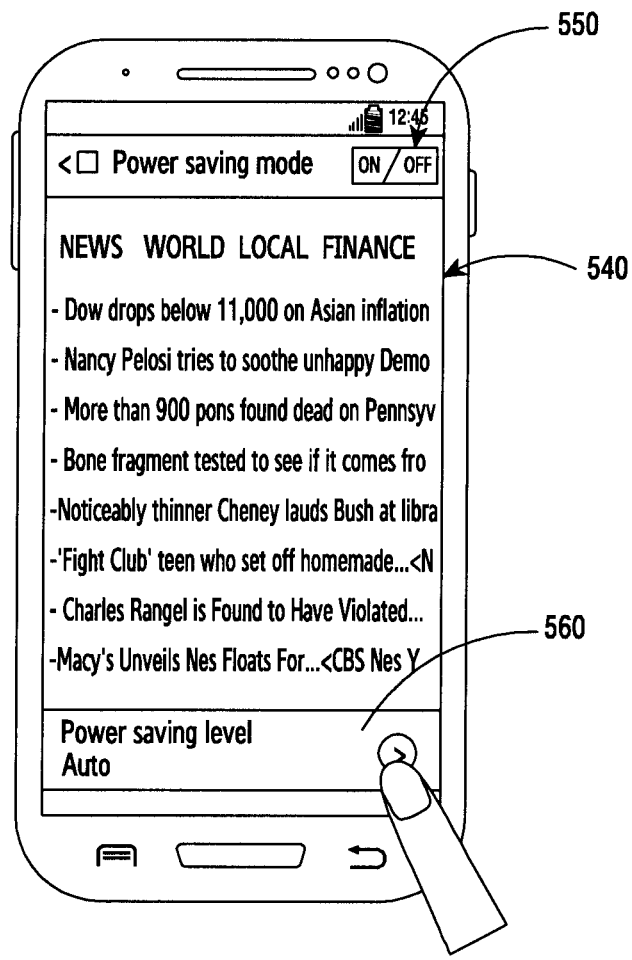
Figure 5E:
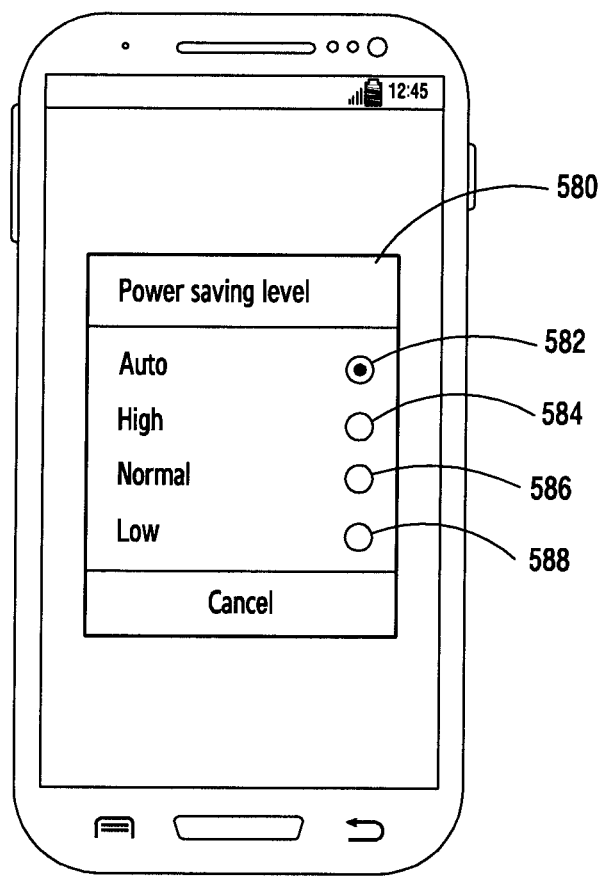
Figure 7A:
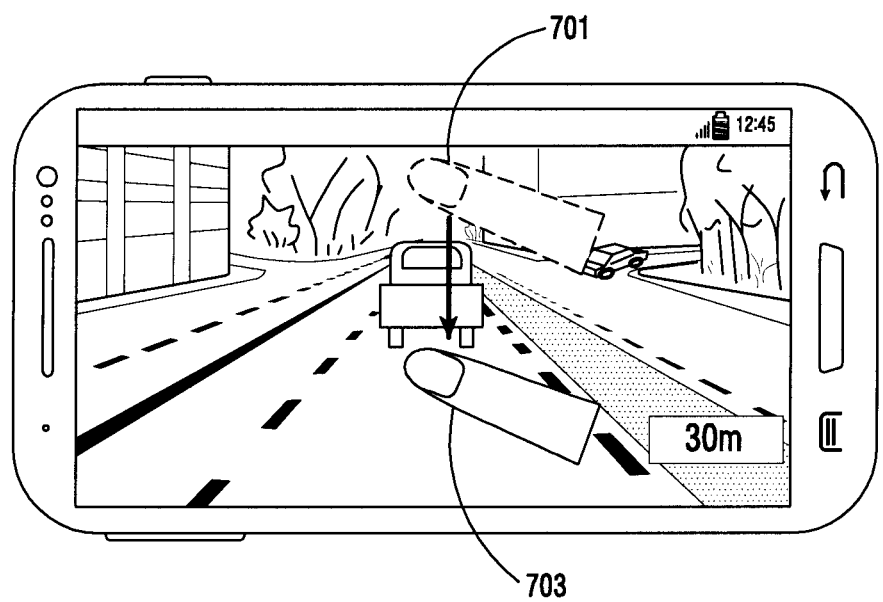
FIGS. 7A to 7B show screen configurations for determining a power consumption level of an application program in an electronic device according to another embodiment of the present invention.
Figure 7B:
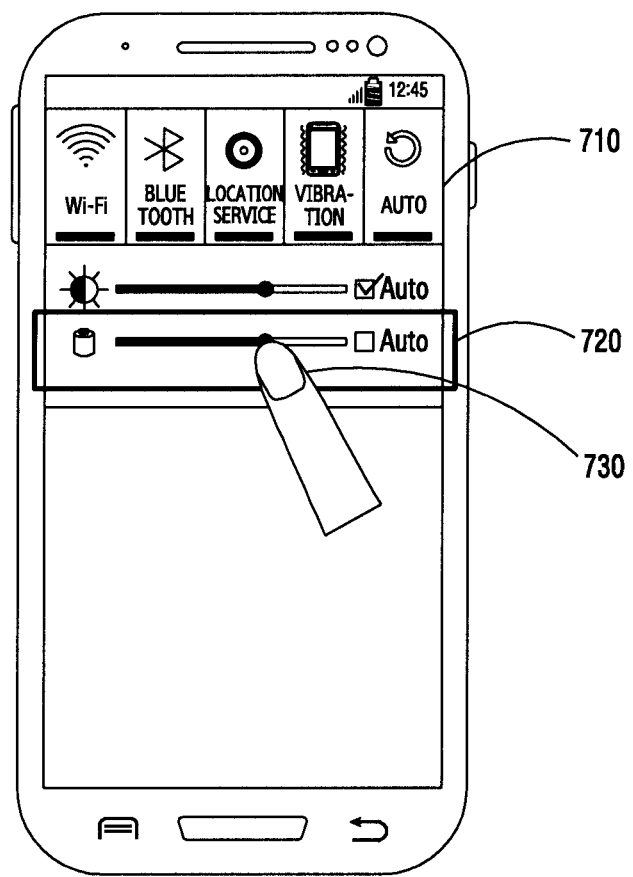

According to various embodiments of the present invention, processor 120 may set a power consumption level for an application program corresponding to input information provided through the input interface 140 by executing a power reference setting program 133 stored in the memory 130. For example, when a power control setting menu 502 is selected, as shown in FIG. 5A, the processor 120 may control an application program list 510 that can control a power to be displayed on the display 150, as shown in FIG. 5B. When a fifth application program 512 is selected among the application program list 510 displayed on the display 150, the processor 120 may control a power setting screen 520 for configuring a power consumption level of the fifth application program to be displayed on the display 150, as shown in FIG. 5C. At this time, the processor 120 may set a power consumption level of the fifth application program according to input information 530 for the power setting screen 520 of the fifth application program. For example, when the power control setting menu 502 is selected as shown in FIG. 5A, the processor 120 may control a power control setting screen 540 to be displayed on the display 150, as shown in FIG. 5D. In this case, the processor 120 may activate (ON) or deactivate (OFF) a power control mode corresponding to configuration information on a power control setting menu 550 of the power control setting screen 540. When a power control level determination menu 560 is selected, the processor 120 may control a power control level setting screen 580 to be displayed on the display 150, as shown in FIG. 5E. In this case, the processor 120 may set any one of an Auto 582, a High 584, a Normal 586, and a Low 588 included in the power control level setting screen 580 as the power consumption levels of application programs driven by the processor 120, corresponding to the input information provided by the input interface 140. As another example, as shown in 7A, while driving the first application program, when a user touches a drop-down menu (for example, the notification bar 710 or a quick panel) (for example, a notification bar display event (701 ->703)), the processor 120 may control, to display on the display 150, the drop-down menu (for example, the notification bar 710) including a power setting screen 720 for configuring the power consumption level of the first application program, as shown in FIG. 7B. At this time, the processor 120 may set the power consumption level of the first application program according to input information 730 on the power setting screen 720 of the first application program. Here, the drop-down menu may not be related to the application program being driven and may represent a control menu, which can be driven at any time in response to the input information of the user.

According to an embodiment, the processor 120 may set the power consumption level of the application program to the High 584 or the Normal 586 or the Low 588 by using the power control level setting screen 580. For example, a basic power consumption level may be mapped to the High 584 of the power control level setting screen 580. For another example, the basic power consumption level may be mapped to the Normal 586 of the power control level setting screen 580. For still another example, the minimum power consumption level for driving an application program may be mapped to the Low 588 of the power control level setting screen 580. Here, the basic power consumption level may include a power consumption level which is configured as a basic value by a device manager or an application program designer in order to drive the application program.

The memory 130 may store commands or data received from or generated by one or more elements (the processor 120, the input interface 140, the display 150, or the communication interface 160) included in the electronic device 100.

The memory 130 may store at least one program for services of the electronic device 100. For example, the memory 130 may include at least one of the battery control program 131, the graphic user interface (GUI) program 132, or the power reference setting program 133. At this time, the memory 130 may store at least one program in the form of programming modules such as a kernel, middleware, an application programming interface (API), and an application program.

According to various embodiments of the present invention, the battery control program 131 may include at least one software element for determining a power consumption policy for each application program. For example, when power consumption policies for one or more application programs are set to an automatic control mode, the battery control program 131 may determine a power consumption level to be used for driving each application program based on a battery remaining level. At this time, the battery control program 131 may determine a power consumption level for each application program corresponding to the battery remaining capacity by using the power consumption level table for each application program stored in memory 130. For another example, when power consumption policies for one or more application programs are set to an automatic control mode, the battery control program 131 may determine a power consumption level to be used for driving each application program based on a battery remaining capacity from the time point at which the battery remaining capacity is smaller than a reference battery remaining capacity. For still another example, when power consumption policies for one or more application programs are set to a user control mode, the battery control program 131 may determine a power consumption level to be used for driving each application program based on input information provided by a user.

According to various embodiments of the present invention, the battery control program 131 may control the driving of the application program based on the power consumption policy for each application program. For example, the battery control program 131 may limit at least one of the performance for performing an operation or data processing of the processor 120 or a haptic function according to the power consumption policy for each application program.

The GUI program 132 may include at least one software element for providing a user interface in a graphic version to the display 150. For example, the GUI program 132 may control application program information that is driven by the processor 120 to be displayed on the display 150. As another example, the GUI program 132 may control, to be displayed on the display 150, the application program information based on the power consumption policy for each application program, determined through the battery control program 131. At this time, the GUI program 132 may adjust at least one among the number of frames used to drive the application program, a resolution, a color palette quantization bit level (color depth), a bit quantization level (bit) of an audio signal, a frequency sampling level (Khz), an audio output level, or a brightness of a screen, in response to the power consumption level of the application program determined using the battery control program 131. For still another example, the GUI program 132 may limit performance for graphic work so as to correspond to the power consumption level of the application program determined using the battery control program 131.

The power consumption level setting program 133 may include at least one software element for setting a power consumption level for the application program corresponding to the input information provided through the input interface 140.

The input unit 140 may transmit commands or data generated by a user's selection to the processor 120 or the memory 130 via the bus 110. For example, the input interface 140 may include at least one of a keypad including at least one hardware button or a touch panel for detecting touch information.

The display 150 may display a picture, an image, or data to a user. For example, the display 150 may display the application program information that is driven by the processor 120.

The communication interface 160 may establish a communication connection between the electronic device 100 and one or more other electronic devices 102 and 104 or a server 164, or one or more peripheral devices. For example, the communication interface 160 may support at least one of a short range communication protocol (for example: Wi-Fi, Blue-Tooth (BT), Near Field communication (NFC), and network communication (such as the Internet, a Local Area Network (LAN), a Wire Area Network (WAN), a telecommunication network, a cellular network, a satellite network, or Plain Old Telephone Service (POTS)).

In various embodiments of the present invention, the processor 120 may control the driving of an application program based on the power consumption policy for the application program. In this case, the processor 120 may control the driving (execution) of an application program based on the power consumption policy for each application program or a load on a system resource. For example, the processor 120 may adjust the number of frames (FPS) to be used to drive the application program based on the load on the system load of the electronic device 100 when a power consumption level corresponding to the load on the system resource of the electronic device 100 is lower than the power consumption level of the application program.

In the above-described embodiment, the processor 120 may control the power consumption for each application program by executing software elements stored in the memory 130 in a single module.

Figure 2:
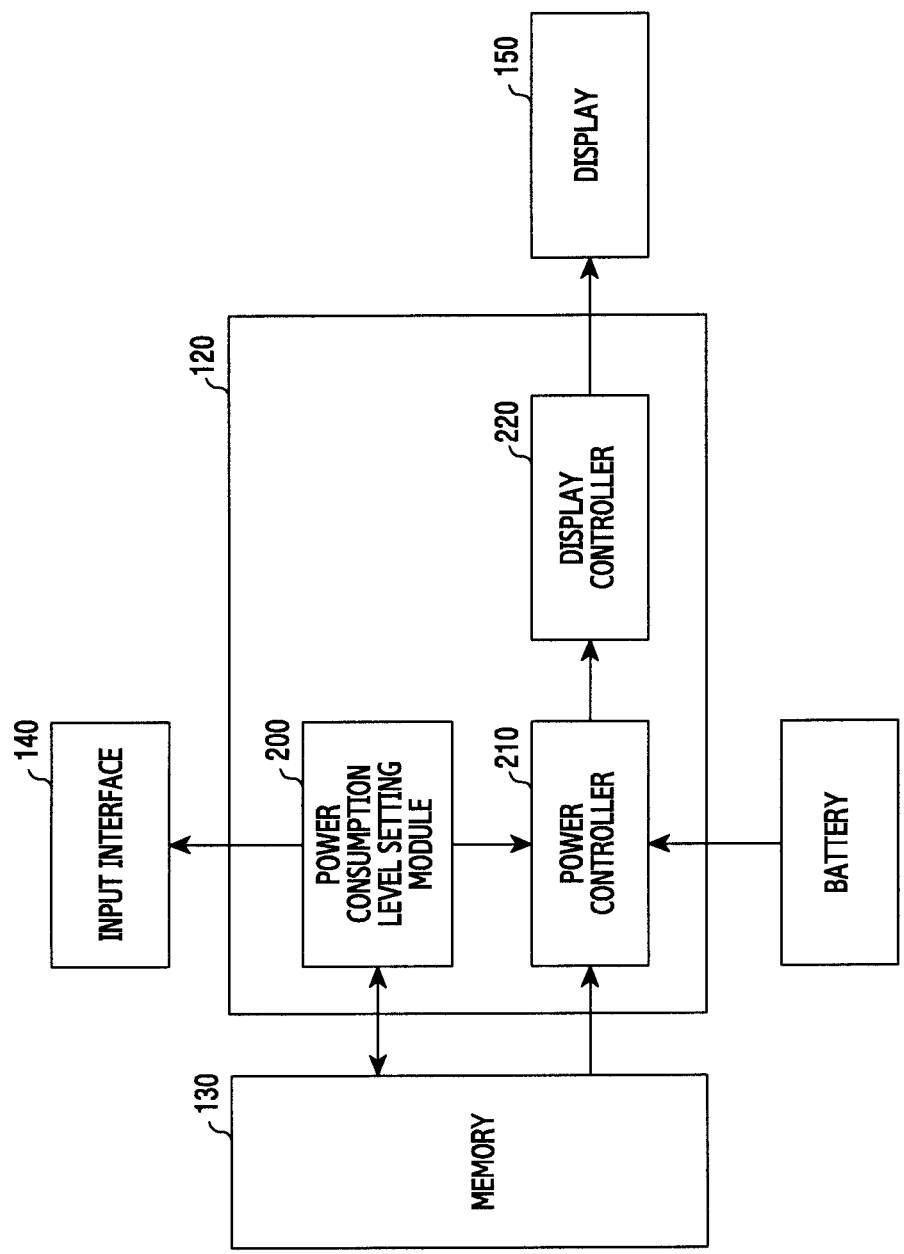
FIG. 2 is a detailed block diagram of a processor according to an embodiment of the present invention.

In other embodiments, as shown in FIG. 2, the processor 120 may configure an element for controlling the power consumption for each application program, so as to be included by separate modules.

FIG. 2 is a detailed block diagram of a processor according to an embodiment of the present invention.

Referring to FIG. 2, the processor 120 may include a power consumption level setting unit 200, a power controller 210, and a display controller 220.

The power consumption level setting unit 200 may set a power consumption level for an application program in response to input information provided through the input interface 140. At this time, the power consumption level setting unit 200 may set a power consumption level for an application program based on the input information provided through the input interface 140 by executing a power consumption level setting program 133 stored in the memory 130. For example, the power consumption level setting unit 200 may set the power consumption level of the fifth application program using a power setting screen 520 as shown in FIG. 5C. For another example, the power consumption level setting unit 200 may activate (ON) or deactivate (OFF) the power control mode by using the power control setting screen 540, as shown in FIG. 5D. For still another example, the power consumption level setting unit 200 may set power consumption levels of application programs driven by the processor 120 by using the power control level setting screen 580 as shown in FIG. 5E. For still another example, as shown in FIG. 7B, the power consumption level setting unit 200 may set the power consumption level of the first application program by using the drop-down menu (for example, the notification bar 710) displayed in the display 150 while driving the first application program.

The power controller 210 may determine a power consumption policy for each application program. At this time, the power controller 210 may execute the battery control program 131 stored in the memory 130 so as to determine a power consumption policy for each application program. For example, when power consumption policies for one or more application programs are set to an automatic control mode, the power controller 210 may determine a power consumption level to be used for driving each application program based on the battery remaining capacity. At this time, the power controller 210 may determine a power consumption level to be used to drive each application program based on the battery remaining capacity from the time point at which the battery remaining capacity of the electronic device 100 is smaller than the reference battery remaining capacity. For still another example, when power consumption policies for one or more application programs are set to a user control mode, the power controller 210 may determine a power consumption level to be used for driving each application program based on input information provided through the input interface 140.

The power controller 210 may control the driving of the application program according to a power consumption policy for each application program. For example, the power controller 210 may limit at least one of the performance for performing an operation or data processing of the processor 120 or a haptic function according to the power consumption policy for each application program. For another example, the power controller 210 may control the driving of an application program based on a power consumption policy for each application program or the load on a system resource. For example, when a power consumption level corresponding to the load of the system resource of the electronic device 100 is lower than a power consumption level of an application program, the power controller 210 may adjust at least one among the number of frames (FPS) used to drive the application program based on the load on the system resource of the electronic device 100, a resolution, a color palette quantization bit level, a bit quantization level of an audio signal, a frequency sampling level, an audio output level, or a brightness of a screen.

The display controller 220 may control the display 150 to provide a user interface in a graphic version. At this time, the display controller 220 may control the display 150 to provide a user interface in a graphic version by executing the GUI program 132 stored in memory 130. For example, the display controller 220 may control application program information to be displayed on the display 150 based on the power consumption policy for each application program. At this time, the display controller 220 may adjust, in response to a power consumption level of an application program determined by the power controller 210, at least one among the performance of the display controller 220 for graphic works, the number of frames used to drive the application program, a resolution, a color palette quantization bit level (color depth), or a brightness of a screen.

According to various embodiments of the present invention, an electronic device may include an input unit, a display, a battery, and a processor that determines a power consumption level required for executing a program in response to an execution input of the program, and executes the program on the basis of the power consumption level.

According to an embodiment of the present invention, the processor may adjust at least one among the performance of the processor used to execute the program based on the power consumption level, performance for graphic works, a haptic function, the number of frames, a resolution, a color palette quantization bit level, a bit quantization level of an audio signal, a frequency sampling level, an audio output level, or a brightness of a screen.

According to an embodiment of the present invention, the processor may include a power controller for determining a power consumption level required for executing a program, and a display controller for executing the program in response to the power consumption level.

According to an embodiment of the present invention, the processor may determine a power consumption level required for executing the program based on the battery remaining capacity of the electronic device.

According to an embodiment of the present invention, when a reference range included in the battery remaining capacity of the electronic device changes, the processor may re-determine a power consumption level required for executing the program based on the battery remaining capacity of the electronic device.

According to an embodiment of the present invention, the processor may compare the battery remaining capacity of the electronic device and the reference battery remaining capacity, and, when the battery remaining capacity of the electronic device is smaller than the reference battery remaining capacity, determine a power consumption level required for executing the program based on the battery remaining capacity.

According to an embodiment of the present invention, the processor may determine a power consumption level required for executing the program based on input information detected by the input unit.

According to an embodiment of the present invention, the processor may execute the application program based on the power consumption level and the load on a system resource for the electronic device.

According to an embodiment of the present invention, the processor may determine an additional power consumption level corresponding to the load on the system resource of the electronic device, and execute the program based on the additional power consumption level when the additional power consumption level is lower than the power consumption level.

According to an embodiment of the present invention, the processor may determine, a second power consumption level required for executing a second program in response to an execution input of the second program during the execution of the program, and execute the second program based on the second power consumption level during the execution of the program based on the power consumption level.

According to an embodiment of the present invention, the display may display the execution information of the second program by using another window different from a window for displaying the execution information of the program.

According to various embodiments of the present invention, an electronic device may include: a display; a battery; and a processor that generates a plurality of windows to be displayed on the display, determines a different power consumption level required for executing a program in each window, and executes the program in each window based on the different power consumption level.

According to an embodiment of the present invention, the processor may generate a plurality of windows so as not to overlap each other.

According to an embodiment of the present invention, the processor may generate a plurality of windows such that one or more windows of the plurality of windows overlap each other.

According to an embodiment of the present invention, the processor may determine a power consumption level required for executing a program executed in each window based on the battery remaining capacity of the electronic device, input information, and a basic power level required for executing the program in each window.

Figure 3:
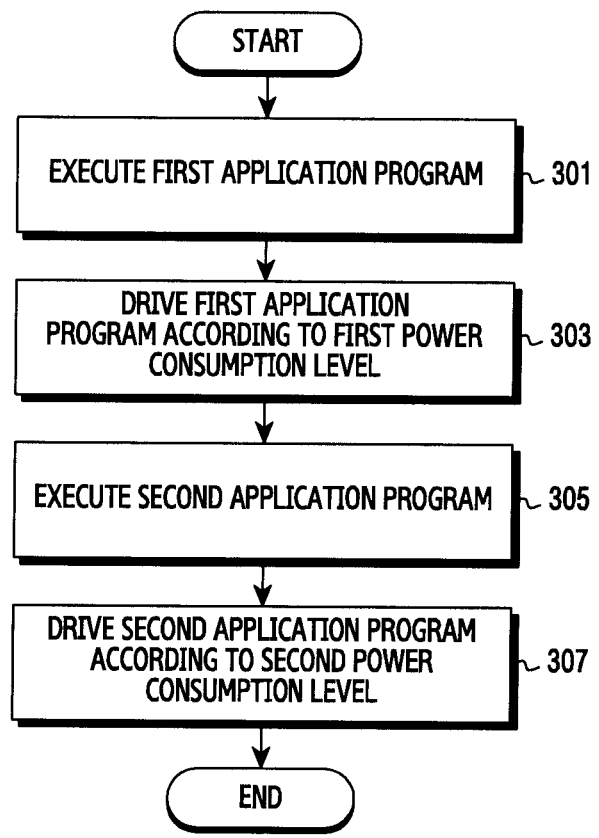
FIG. 3 is a flow chart for controlling a power consumption level for each application program in an electronic device according to an embodiment of the present invention.

FIG. 3 is a flow chart for controlling a power consumption level for each application program in an electronic device according to an embodiment of the present invention.

Referring to FIG. 3 the electronic device may check whether a first application program is executed, among application programs installed on the electronic device, in operation 301. For example, the electronic device may determine whether the first application program is chosen, based on input information provided through the input interface 140.

When the first application program is executed, the electronic device may drive the first application program in response to a first power consumption level that is a power control level for the first application program, in operation 303. For example, the electronic device may adjust at least one among performance (for example, maximum performance) of the processor 120 used to drive the first application program corresponding to a first power consumption level, performance for graphic works, a haptic function, the number of frames (FPS), a resolution, a color palette quantization bit level, a bit quantization level of an audio signal, a frequency sampling level, an audio output level, or a brightness of a screen. Here, the first power consumption level may include any one of a power consumption level predetermined based on the battery remaining capacity of the electronic device or a power consumption level corresponding to input information.

The electronic device may determine whether the second application program is executed, among application programs installed in the electronic device, in operation 305. For example, while the first application program is being driven, the electronic device may check whether the second application program is selected in response to input information provided through the input interface 140. For another example, when the driving of the first application program has ended, the electronic device may check whether the second application program is selected in response to input information provided through the input interface 140.

When a second application program is executed, the electronic device may drive the second application program corresponding to a second power consumption level that is a power control level for the second application program, in operation 307. For example, the electronic device may adjust at least one among performance of the processor 120 used to drive the second application program corresponding to the second power consumption level, performance for graphic works, a haptic function, the number of frames (FPS), a resolution, a color palette quantization bit level, a bit quantization level of an audio signal, a frequency sampling level, an audio output level, or a brightness of a screen. Here, the second power consumption level may include any one of a power consumption level predetermined based on the battery remaining capacity of the electronic device or a power consumption level determined by the input information. At this time, the first power consumption level and the second power consumption level may be the same as or different from each other.

In the above-described embodiment, when the second application program is driven while the first application program is being driven, the electronic device may configure a multi-window so as to drive the first application program and the second application program at the same time. In this case, the electronic device may apply the same power consumption level or different power consumption levels to the first application program and the second application program driven in different windows on the basis of at least one of the battery remaining capacity of the electronic device or application program characteristics.

Figure 4:
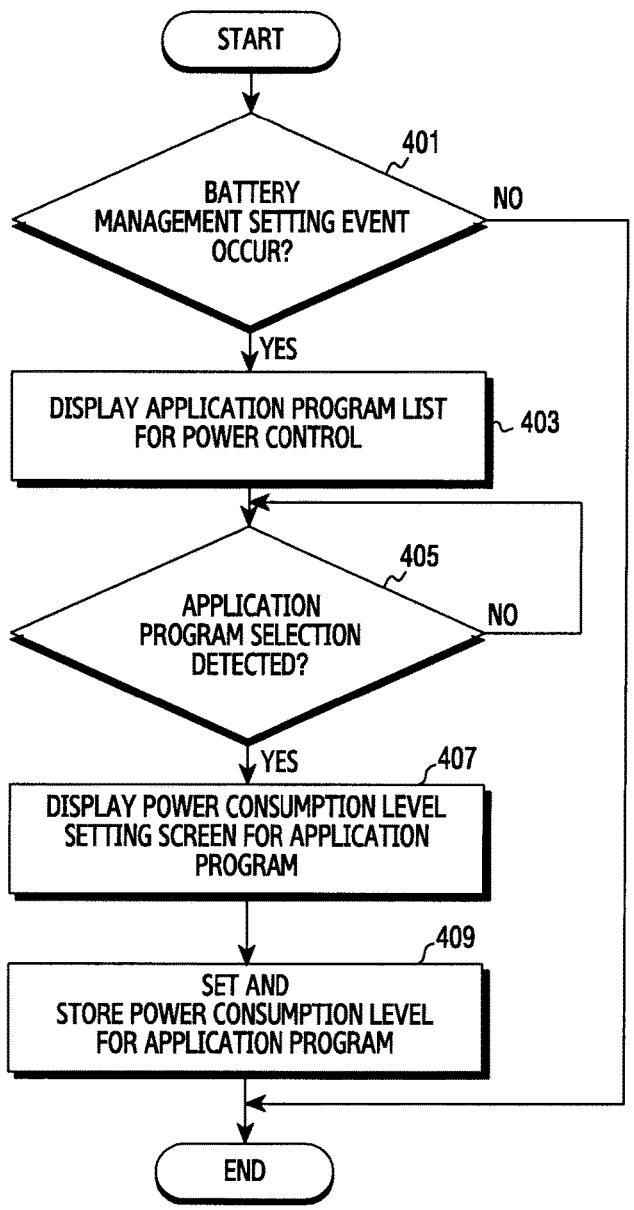
FIG. 4 is a flow chart for determining a power consumption level for each application program in an electronic device according to an embodiment of the present invention.

FIG. 4 is a flow chart for determining a power consumption level for each application program in an electronic device according to an embodiment of the present invention. The following description explains a flow for determining a power consumption level of the application program, with reference to the screen configuration shown in FIG. 5A to FIG. 5C.

Referring to FIG. 4, the electronic device may check whether the battery management configuration event occurs in operation 401. For example, the electronic device may determine whether the power control setting menu 502 is selected on the menu screen 500 displayed on the display

150 as shown in FIG. 5A, in response to the input information provided through the input interface 140.

When the battery management configuration event has not occurred, the electronic device may end the present algorithm.

When the battery management configuration event occurs, the electronic device may display, on the display 150, a list of application programs capable of controlling the power in operation 403. For example, when the battery management configuration event has occurred, the electronic device may display, on the display 150, a list of the application programs 510 capable of controlling the power among application programs installed in the electronic device, as shown in FIG. 5B.

When the list of application programs capable of controlling the power is displayed on the display 150, the electronic device may check whether any of the application programs is selected from the list of application programs displayed on the display 150, in operation 405. For example, the electronic device may check whether any one application program (for example, the fifth application program 512) for the power control configuration is selected from among the application program list 510 displayed on the display 150 as shown in FIG. 5B in response to the input information provided through the input interface 140.

When any one application program is selected from the application program list displayed on the display 150, the electronic device may display, on the display 150, a power setting screen which can set a power consumption level for the application program selected from the operation 407. For example, when the fifth application program 512 is selected, the electronic device may display, on the display 150, a power setting display 520 for setting a power consumption level of the fifth application program 512, as shown in FIG. 5C.

The electronic device may set the power consumption level of the application program selected in operation 405 in response to input information detected by the power setting screen in operation 409 so as to store the power consumption level in the memory 130. For example, the electronic device may set the power consumption level of the fifth application program according to input information 530 for the power setting screen 520 of the fifth application program 512.

In the above-described embodiment, the electronic device may determine a power consumption level for each application program in response to the selection of the power control setting menu 502.

In another example, when the power control setting menu 502 is selected, as shown in FIG. 5A, the electronic device may display, on the display 150, a power control setting screen 540 as shown in FIG. 5D. At this time, the electronic device may activate (ON) or deactivate (OFF) the power control mode for the electronic device in response to the configuration information for the power control setting menu 550 of the power control setting screen 540.

Figure 11:
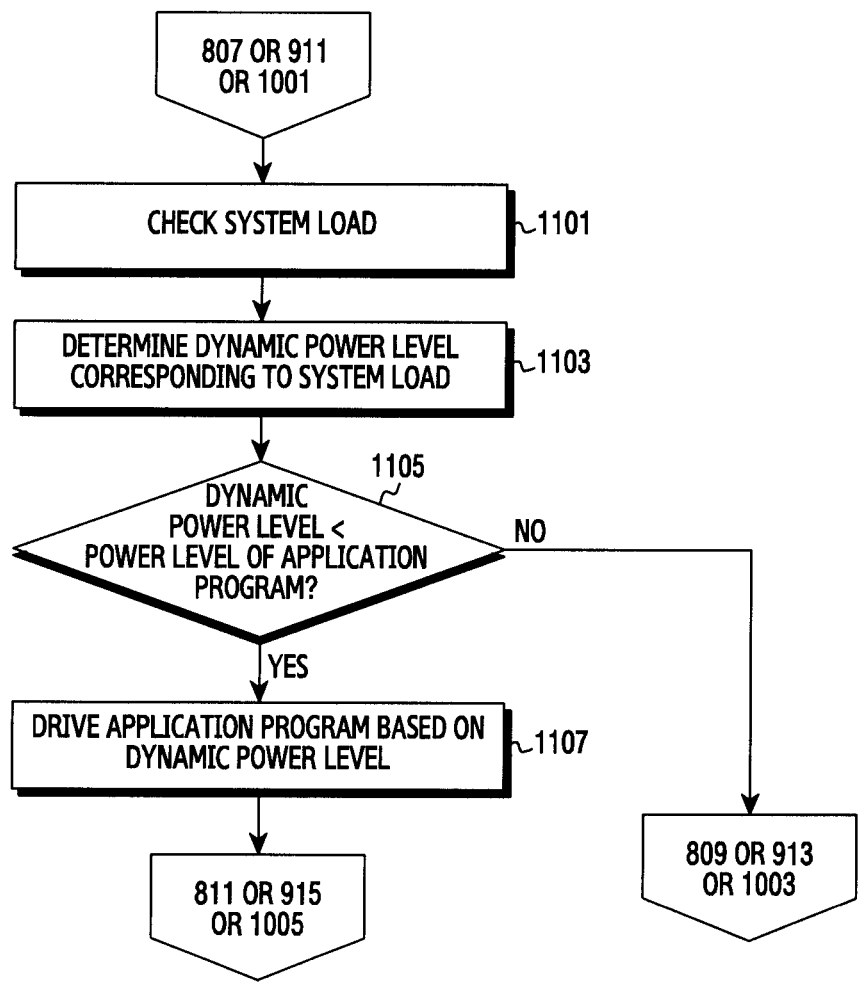
FIG. 11 is a flow chart for controlling a power consumption level of an application program based on the load on a system resource in an electronic device according to an embodiment of the present invention.

According to an embodiment, when a power control level determining menu 560 is selected, the electronic device may display a power control level setting screen 580 on the display 150, as shown in FIG. 5E. In this case, the electronic device may configure any one of an Auto 582, a High 584, a Normal 586, and a Low 588 included in the power control level setting screen 580 as the power consumption level of the electronic device, in response to the input information provided by the input interface 140. For example, when the Auto 582 of the power consumption level setting screen 580 is set as the power consumption level of the electronic device, the electronic device may drive an application program on the basis of the power consumption level for each application program corresponding to the battery remaining capacity, or a basic power consumption level of the application program, as shown in the following FIG. 8 or FIG. 9. For another example, when any one of the Auto 582, the High 584, the Normal 586, and the Low 588 is set as the power consumption level of the electronic device, the electronic device may drive the application program in response to the power consumption level determined by the user as shown in FIG. 11. At this time, the electronic device may determine the power consumption level for each application program by using the power control level (the High 584, the Normal 586, and the Low 588) determined by the basic power consumption level for each application program and the user. Here, the basic power consumption level may indicate the power consumption level (for example, 60FPS) of the application program set by the device manager or the application program designer.

Figure 6:
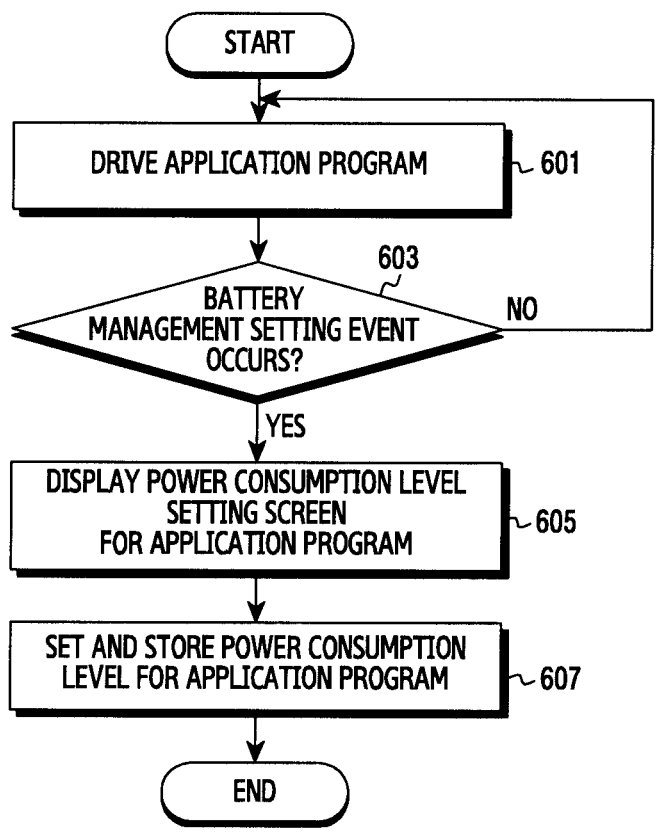
FIG. 6 is a flow chart for determining a power consumption level for an application program in an electronic device according to another embodiment of the present invention.

FIG. 6 is a flow chart for determining a power consumption level for an application program in an electronic device according to another embodiment of the present invention. The following description explains a flow for determining a power consumption level of the application program, with reference to screen configurations shown in FIG. 7A and FIG. 7B.

Referring to FIG. 6, the electronic device may drive an application program in operation 601. For example, the electronic device may drive the first application program, as shown in FIG. 7A.

When the application program is driven, the electronic device may check whether the battery management setting event occurs in operation 603. For example, the electronic device may check whether an input on the drop-down menu (for example, dragging the notification bar display event from 701 to 703) is detected, as shown in FIG. 7A, in response to the input information provided through the input interface 140.

When the battery management configuration event has not occurred, the electronic device may continuously drive the application program in operation 601.

According to an embodiment, when the battery management setting event occurs, the electronic device may display, on the display 150, a power setting screen which can set the set power consumption level for the application program that is being executed in operation 605. For example, when the battery management setting event (for example, the notification bar display event) occurs, the electronic device may display, on the display 150, the notification bar 701 including a power setting screen 720 for setting the power consumption level of the first application program, as shown in FIG. 7B.

The electronic device may set the power consumption level of the application program being driven corresponding to the input information detected through the power setting screen so as to store the power consumption level in the memory 130, in operation 607. For example, the electronic device may set the power consumption level of the first application program according to input information 730 on the power setting screen 720 of the first application program.

Figure 8:
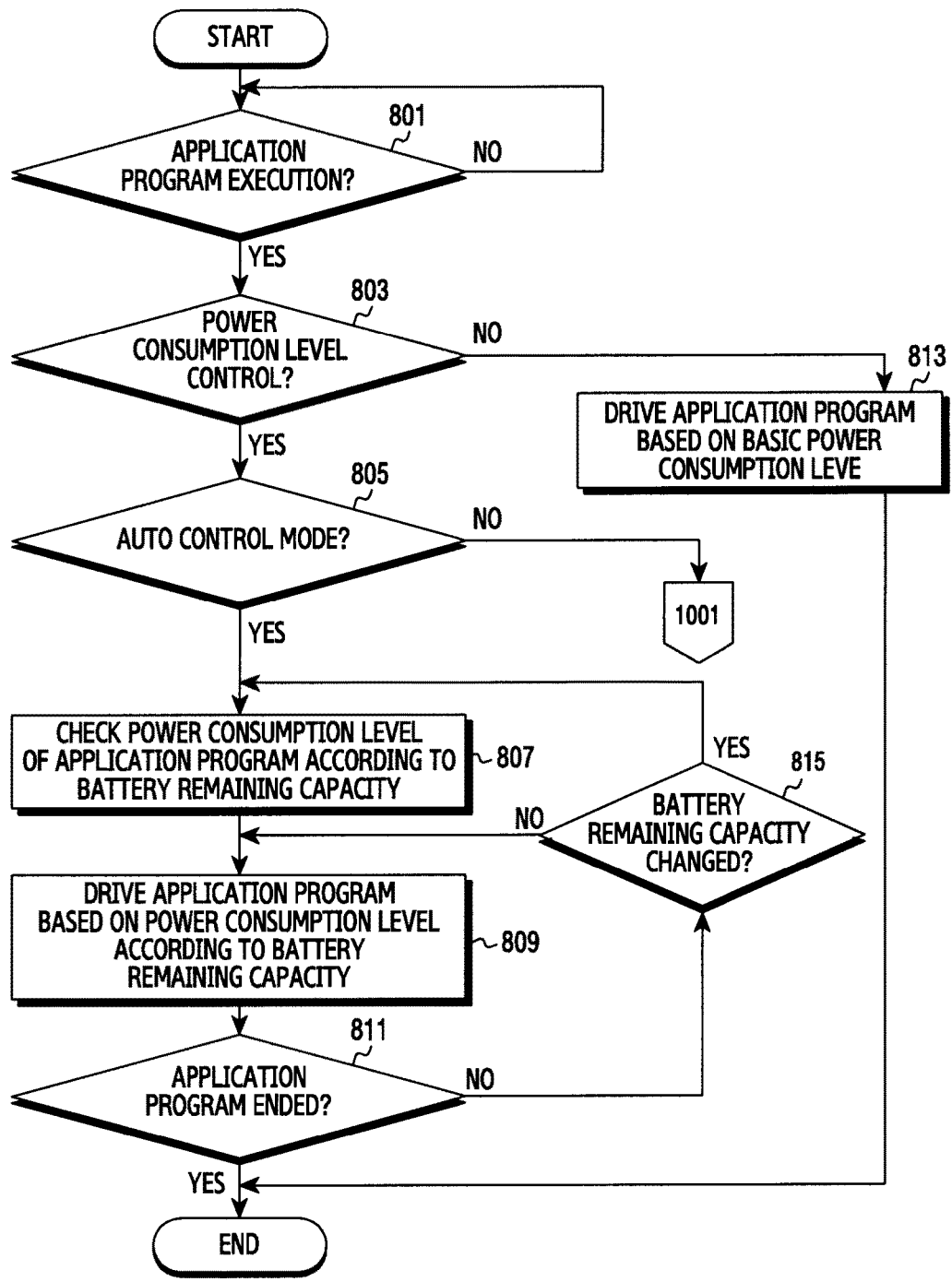
FIG. 8 is a flow chart for controlling a power consumption level of an application program according to an automatic mode in an electronic device according to an embodiment of the present invention.

FIG. 8 is a flow chart for controlling a power consumption level of an application program according to an automatic mode in an electronic device according to an embodiment of the present invention.

Referring to FIG. 8, the electronic device may check whether any one application program is executed, among application programs installed on the electronic device, in operation 801. For example, the electronic device may determine whether the first application program is selected corresponding to the input information provided through the input interface 140.

When the application program is executed, the electronic device may determine whether to control the power consumption level in operation 803. For example, the electronic device may determine whether to control the power consumption level based on the menu setting information on the power consumption level. For another example, the electronic device may determine whether to control the power consumption level corresponding to the input information provided through the input interface 140. For still another example, the electronic device may determine whether to control the power consumption level based on the battery remaining capacity. For example, when the battery remaining capacity is smaller than the reference battery remaining capacity, the electronic device may determine that the power consumption level is controlled. Here, the reference battery capacity may indicate the battery remaining capacity of the electronic device for determining the time point at which the power control is performed through a power consumption auto control mode.

When the power consumption level is not controlled, the electronic device may drive the application program by the basic power consumption level of the application program being executed in operation 813. Here, the basic power consumption level may include a power consumption level which is configured as a main value by a device manager or an application program designer in order to drive the application program.

According to an embodiment, when the power consumption level is controlled, the electronic device may check whether the automatic control mode is set for the power control of the electronic device in operation 805.

Figure 10:
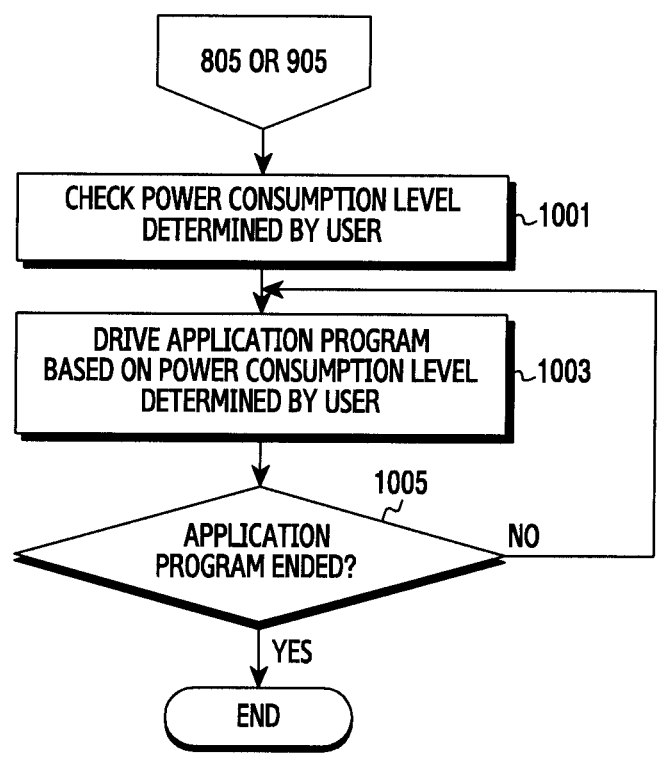
FIG. 10 is a flow chart for controlling a power consumption level of an application program according to a user mode in an electronic device according to an embodiment of the present invention.

When the automatic control mode is not set, the electronic device may proceed to operation 1001 shown in FIG. 10 to determine the power consumption level set by the user.

According to an embodiment, when the automatic control mode is set, the electronic device may determine the power consumption level of the application program corresponding to the battery remaining capacity of the electronic device in operation 807. For example, the electronic device may determine the power consumption level of the application program corresponding to the battery remaining capacity of the electronic device by using the power consumption level table for the application program stored in memory 130.

When the power consumption level of the application program corresponding to the battery remaining capacity is determined, the electronic device may drive the application program based on a power consumption level of the application program corresponding to the battery remaining capacity in operation 809. For example, the electronic device may adjust at least one among performance of the processor 120 used to drive an application program corresponding to the power consumption level of the application program, performance for graphic works, a haptic function, the number of frames (FPS), a resolution, a color palette quantization bit level, a bit quantization level of an audio signal, a frequency sampling level, an audio output level, or a brightness of a screen.

The electronic device may check whether the driving of the application program has ended in operation 811.

When the driving of the application program has ended, the electronic device may end the present algorithm.

When the driving of the application program has not ended, the electronic device may check whether a reference range including the battery remaining capacity of the electronic device is changed, in operation 813. For example, the electronic device may determine whether the battery remaining capacity exceeds the reference range corresponding to the power consumption level of the application program determined by the operation 807.

When the battery power consumption level is not changed, the electronic device may drive the application program based on a power consumption level of the application program corresponding to the battery remaining capacity in operation 809.

Figure 9:
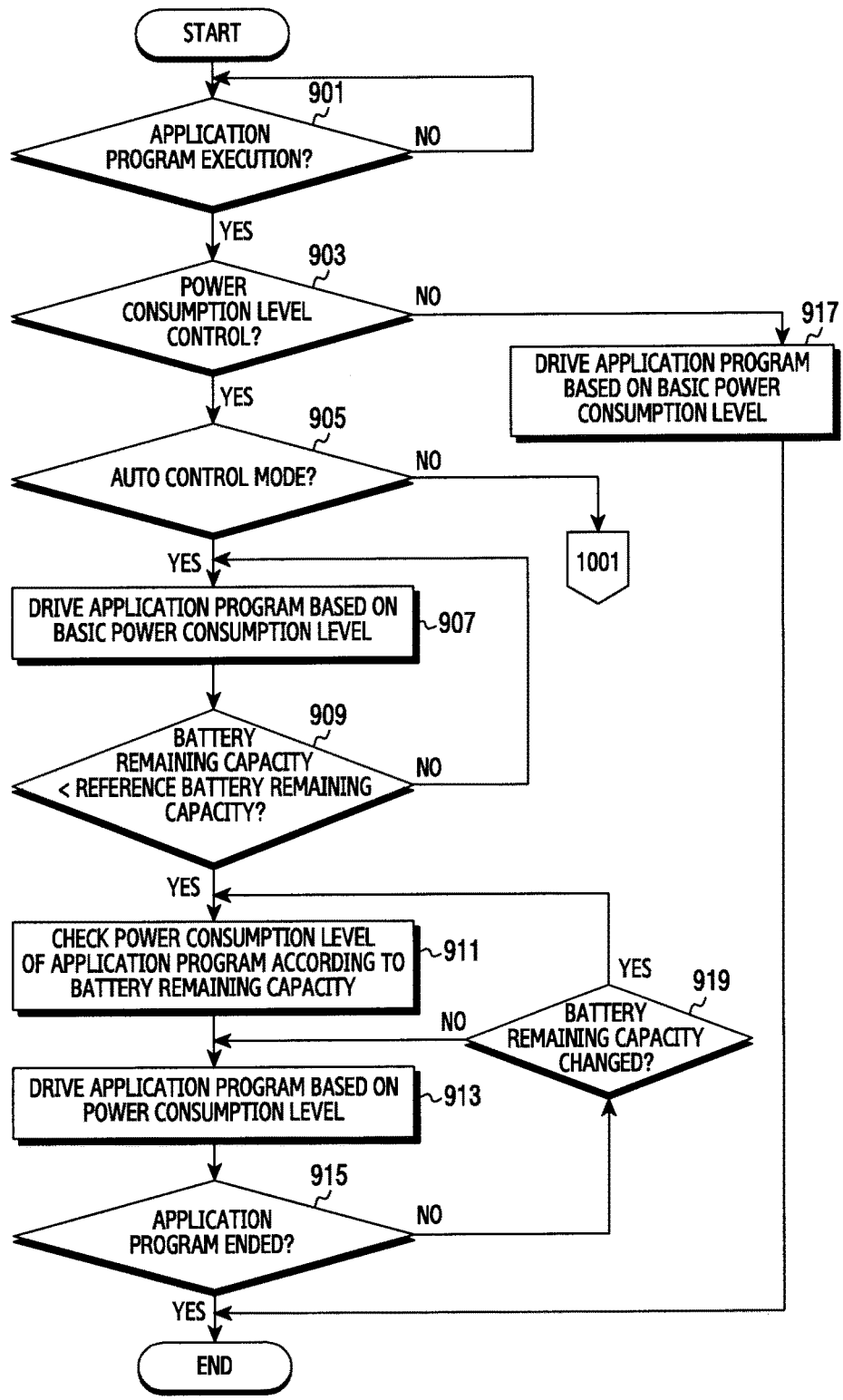
FIG. 9 is a flow chart for controlling a power consumption level of an application program according to an automatic mode in an electronic device according to an embodiment of the present invention.

FIG. 9 is a flow chart for controlling a power consumption level of an application program according to an automatic mode in an electronic device according to an embodiment of the present invention.

Referring to FIG. 9, the electronic device may check whether any one application program is executed, among application programs installed on the electronic device, in operation 901.

When the application program is executed, the electronic device may determine whether to control the power consumption level in operation 903.

When the power consumption level is not controlled, the electronic device may drive the application program by the basic power consumption level of the application program being executed in operation 917. Here, the basic power consumption level may include a power consumption level which is configured as a basic value by a device manager or an application program designer in order to drive the application program.

According to an embodiment, when the power consumption level is controlled, the electronic device may check whether the automatic control mode is set for the power control of the electronic device in operation 905.

When the automatic control mode is not set, the electronic device may proceed to operation 1001 shown in FIG. 10 to determine the power consumption level set by the user.

According to an embodiment, when the automatic control mode is set, the electronic device may drive the application program corresponding to the basic power consumption level in operation 907.

The electronic device may determine whether the battery remaining capacity is smaller than the reference battery remaining capacity in operation 909. Here, the reference battery capacity may indicate the battery remaining capacity of the electronic device to determine the time point at which the power control is performed through a power consumption auto control mode.

According to an embodiment, when the battery remaining capacity of the electronic device is smaller than the reference battery remaining capacity, the electronic device may determine the power consumption level of the application program corresponding to the battery remaining capacity of the electronic device, in operation 911. For example, the electronic device may determine the power consumption level of the application program corresponding to the battery remaining capacity of the electronic device by using the power consumption level table for the application program stored in memory 130.

When the power consumption level of the application program corresponding to the battery remaining capacity is determined, the electronic device may drive the application program based on a power consumption level of the application program corresponding to the battery remaining capacity in operation 913. For example, the electronic device may adjust at least one among performance of the processor 120 used to drive an application program in response to the power consumption level of the application program, performance for graphic works, a haptic function, the number of frames (FPS), a resolution, a color palette quantization bit level, a bit quantization level of an audio signal, a frequency sampling level, an audio output level, or a brightness of a screen.

The electronic device may check whether the driving of the application program has ended in operation 915.

When the driving of the application program has ended, the electronic device may end the present algorithm.

According to an embodiment, when the driving of the application program is not ended, the electronic device may check whether a reference range including the battery remaining capacity of the electronic device is changed, in operation 919. For example, the electronic device may determine whether the battery remaining capacity exceeds the reference range corresponding to the power consumption level of the application program determined by the operation 911.

When the battery power consumption level is not changed, the electronic device may drive the application program based on a power consumption level of the application program corresponding to the battery remaining capacity in operation 913.

FIG. 10 is a flow chart for controlling a power consumption level of an application program according to a user mode in an electronic device according to an embodiment of the present invention.

Referring to FIG. 10, when an automatic control mode is not set in operation 805 of FIG. 8 and operation 905 of FIG. 9, the electronic device may recognize that a user control mode is set. Accordingly, the electronic device may check the power consumption level determined by the user in operation 1001. For example, the electronic device may check the power consumption level for the application program configured by the user input information and then store the power consumption level in the memory 130. For another example, when the power consumption level is determined by the power consumption level setting screen 580 of FIG. 5E, the electronic device may determine a power consumption level for an application program based on a power control level determined by the optimum power consumption level of the application program and the user.

According to an embodiment, when the power consumption level of the application program set by the user is checked, the electronic device may drive an application program based on a power consumption level of the application program in operation 1003. For example, the electronic device may adjust at least one among performance of the processor 120 used to drive an application program in response to the power consumption level of the application program, performance for graphic works, a haptic function, the number of frames (FPS), a resolution, a color palette quantization bit level, a bit quantization level of an audio signal, a frequency sampling level, an audio output level, or a brightness of a screen.

The electronic device may check whether the driving of the application program has ended in operation 1005.

When the driving of the application program has ended, the electronic device may end the present algorithm.

When the driving of the application program is not ended, the electronic device may drive the application program based on a power consumption level of the application program set by the user in operation 1003.

FIG. 11 is a flow chart for controlling a power consumption level of an application program based on the load on a system resource in an electronic device according to an embodiment of the present invention.

Referring to FIG. 11, when the power consumption level of the application program corresponding to the battery remaining capacity of the electronic device is determined in operation 807 of FIG. 8 and operation 911 in FIG. 9, or the power consumption level determined by the user is checked in operation 1001 in FIG. 10, the electronic device may check the load on the system resource of the electronic device, in operation 1101. For example, the electronic device may determine the load on the system resource by using at least one of a frequency of use or a workload of the processor 120. Here, the processor 120 may include at least one of a Central Processing Unit (CPU) or a Graphic Processing Unit (GPU).

According to an embodiment, when the load on the system resource is checked, the electronic device may determine a dynamic power consumption level corresponding to the load on the system resource, in operation 1103. For example, the electronic device may determine the power consumption level of the application program corresponding to the load on the system resource as the dynamic power consumption level, by using the power consumption level table for the application program stored in memory 130.

The electronic device may check whether a dynamic power consumption level is smaller than the power consumption level of the application program, in operation 1105.

When the dynamic power consumption level is equal to or greater than the power consumption level of the application program in operation 1105, the electronic device may drive the application program based on the power consumption level of the application program corresponding to the battery remaining capacity of the electronic device in the operation 809 of FIG. 8 or the operation 913 of FIG. 9, or may drive the application program based on the power consumption level determined by the user in operation 1003 of FIG. 10.

When the dynamic power consumption level is smaller than the power consumption level of the application program in operation 1105, the electronic device may drive the application program based on the dynamic power consumption level in operation 1107. For example, the electronic device may drive the application program so as to correspond to the number of frames corresponding to the dynamic power consumption level.

The electronic device may check that the driving of the application program has ended in the operation 811 of FIG. 8, the operation 915 of FIG. 9 or the operation 1005 of FIG. 10.

When the driving of the application program has not ended in the operation 911 of FIG. 9, the operation 1015 of FIG. 10 or the operation 1105 of FIG. 11, the electronic device may check the load on the system resource of the electronic device in operation 1101.

Figure 12:
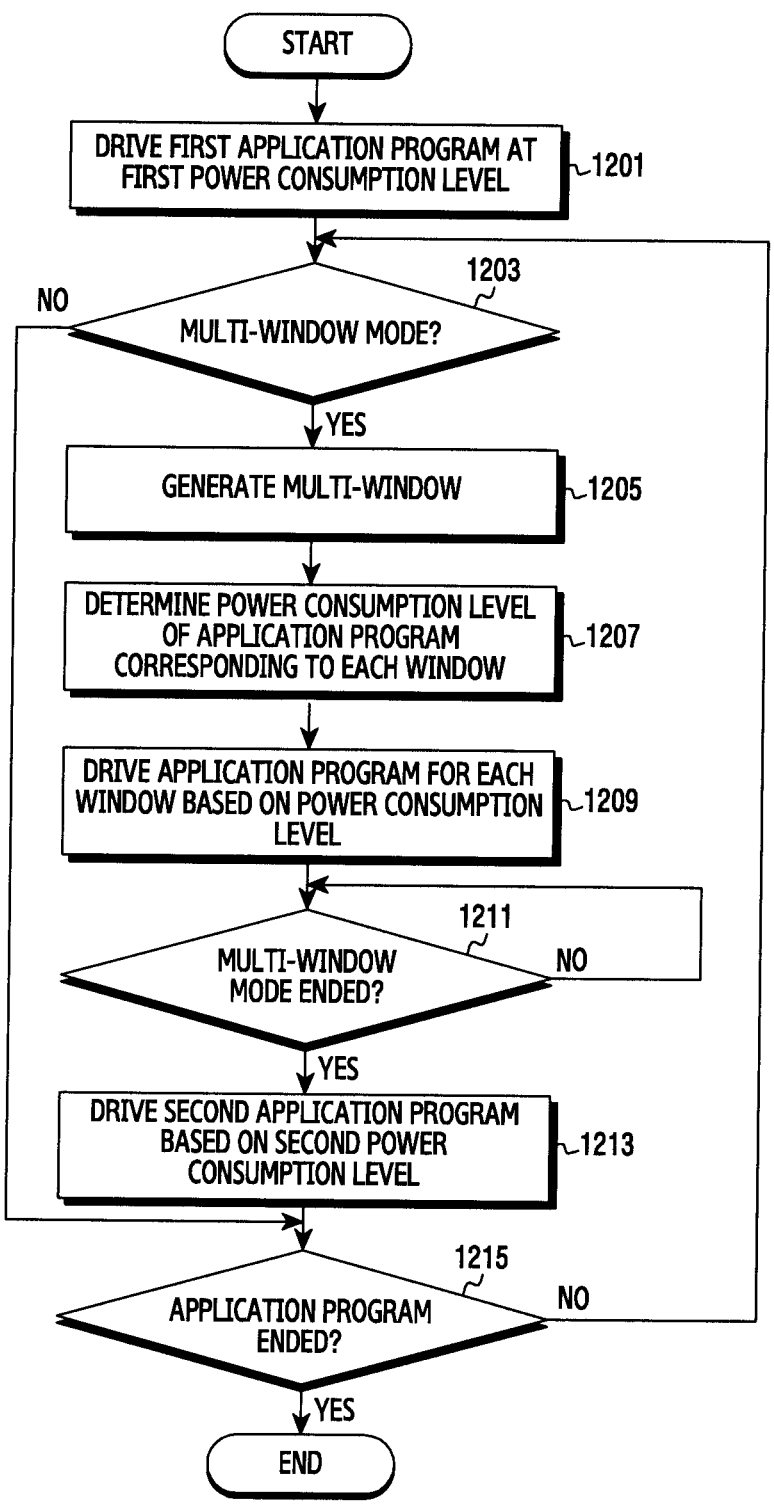
FIG. 12 is a flow chart for controlling a power consumption level of an application program when using the multi-window in an electronic device according to an embodiment of the present invention.

FIG. 12 is a flow chart for controlling a power consumption level of an application program when using a multi-window in an electronic device according to an embodiment of the present invention. The following description explains a flow for determining a power consumption level of the application program with reference to the screen configuration shown in FIG. 13A to FIG. 13C.

Referring to FIG. 12, the electronic device may drive the first application program among application programs installed in the electronic device so as to correspond to the first power consumption level, in operation 1201. For example, the electronic device may drive the first application program corresponding to any one power level of the power consumption level of the first application program determined based on at least one of the basic power consumption level of the first application program, the battery remaining capacity, or system load, or the power consumption level of the first application program determined based on the user's input information.

Figure 13A:
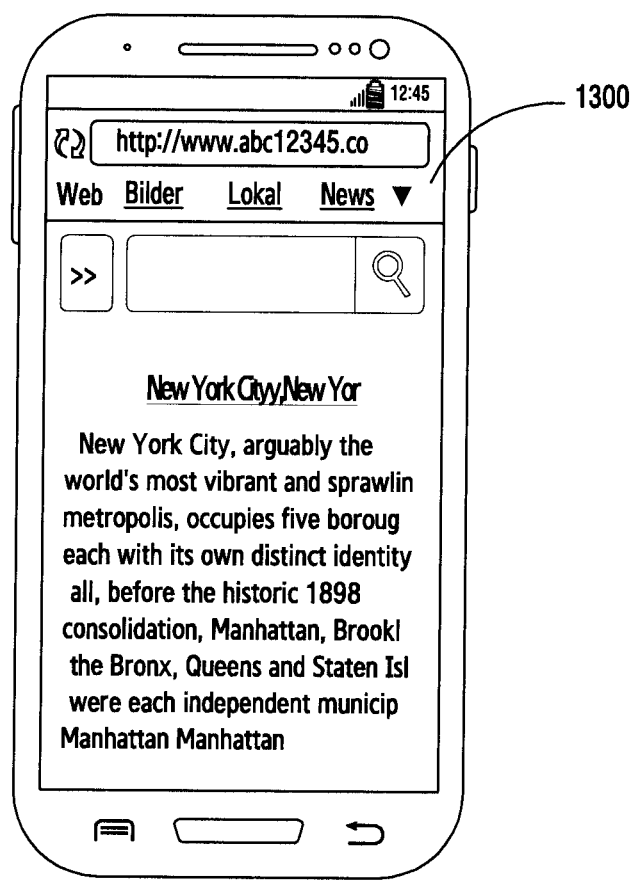
FIGS. 13A to 13C show screen configurations that controls a power consumption level of an application program in an electronic device according to an embodiment of the present invention.

The electronic device may check whether the multi-window mode is executed in operation 1203. For example, the electronic device may check whether a driving of the second application program is additionally selected while driving the first application program (for example, a web page 1300), as shown in FIG. 13A. For another example, the electronic device may check whether a multi-window menu (for example, an icon) is selected corresponding to the input information provided through the input interface 140.

When the multi-window mode is not executed in operation 1203, the electronic device may check whether the driving of the first application program has ended in operation 1215.

Figure 13B:
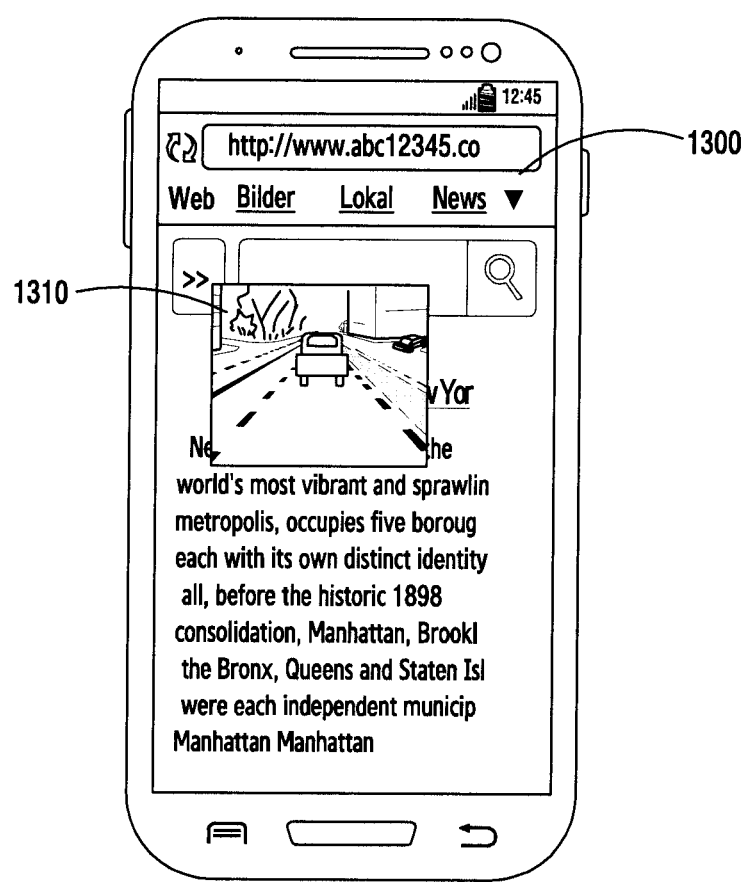

According to an embodiment, when the multi-window mode is executed in operation 1203, the electronic device may generate a multi-window for driving each application program in operation 1205. For example, the electronic device may display, on at least a part of the display 150, a second window for driving the second application program (for example, a game 1310) while driving the first application program (for example, a web page 1300), through the first window, as shown in FIG. 13B. For another example, the electronic device may divide the display area of the display 150 into a first window for driving the first application program (for example, the Web page 1300) and a second window for driving the second application program (for example, the game 1310) and display thereof.

The electronic device may determine the power consumption level for each application program that is driven through each window in operation 1207. For example, the electronic device may apply a different policy to each window so as to determine a power consumption level for an application program. For another example, when applying the same power consumption policy to the multi-window, the electronic device may determine the different power consumption levels based on the characteristics of the application program (for example, a type of the application program) to be driven through each window. In this case, the electronic device may maintain the power consumption level of the first application program as the power consumption level determined in operation 1201.

The electronic device may drive an application program for each window based on the power consumption levels corresponding to each window, in operation 1209. For example, the electronic device may drive the second application program (for example, the game 1310) at 30FPS through the second window while driving the first application program (for example, the Web page 1300) at 60FPS through the first window in FIG. 13B. In this case, the electronic device may configure a frame so as to correspond to the power control level (for example, FPS) for each application program at an output end (for example, a surface flinger end) for outputting the driving information of the application program to the display 150.

The electronic device may check whether the multi-window mode has ended in operation 1211. For example, the electronic device may check whether the driving of at least one application program among application programs being driven through the multi-window has ended to thereby end the multi-window mode. For another example, the electronic device may check whether the multi-window mode has ended based on the input information provided through the input interface 140.

When the multi-window mode has not ended in operation 1211, the electronic device may drive the application program for each window based on the power consumption levels corresponding to each window in operation 1209. Although not shown, the electronic device may reset the power consumption level for at least one window based on at least one of the change in the reference range that includes the battery remaining capacity of the electronic device or the change in the system load, while operating in the multi-window mode. The electronic device may be driven by generating an additional multi-window.

When the multi-window mode has ended in operation 1211, the electronic device may drive a third application program being driven through a single window based on the second power consumption level, in operation 1213. For example, the electronic device may drive the third application program by using the second power consumption level of the third application program being used for the multi-window mode. For another example, the electronic device may drive the third application program by determining a second power consumption level corresponding to the power consumption policy. Here, the third application program may include the first application program or the second application program which is any of the application programs being driven on the electronic device during the multi-window mode.

The electronic device may check whether the driving of the application is ended in operation 1215.

When the driving of the application is ended, the electronic device may end the present algorithm.

When the driving of the application is not ended, the electronic device may check whether the multi-window mode is executed in operation 1203. Although not shown, the electronic device may reset the power consumption level for at least one window based on at least one of the change in the reference range that includes the battery remaining capacity of the electronic device or the change in the system load.

Figure 13C:
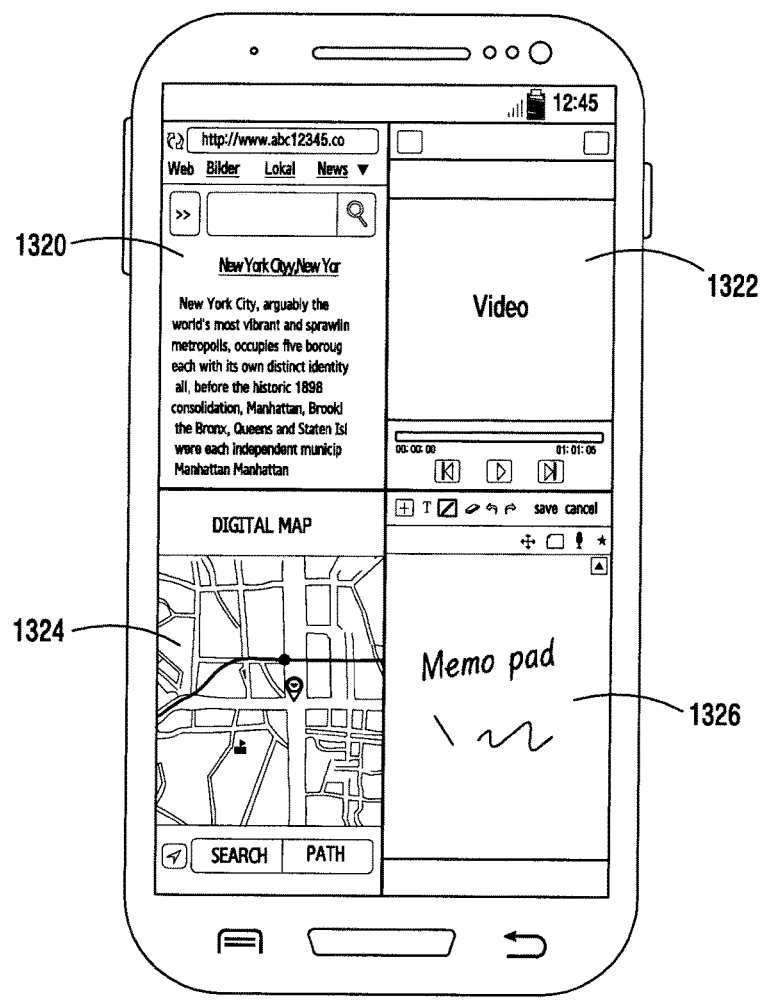

In accordance with various embodiments of the present invention, as shown in FIG. 13C, when the multi-window is configured such that windows 1320, 1322, 1324, and 1326 do not overlap with each other, the electronic device may set a different power consumption policy or a different power consumption level in each window.

According to various embodiments of the present invention, a method for controlling a power in an electronic device may include: determining a power consumption level required for the executing a program in response to an execution input of the program, and executing the program on the basis of the power consumption level.

According to an embodiment of the present invention, the determining of the power consumption level may include determining a power consumption level required for executing the program based on the battery remaining capacity of the electronic device.

According to an embodiment of the present invention, the method further includes: checking the battery remaining capacity of the electronic device in response to the execution input of the program, before determining the power consumption level; and comparing the battery remaining capacity of the electronic device and a reference battery remaining capacity, wherein determining of the power consumption level includes determining a power consumption level required for executing the program based on the battery remaining capacity of the electronic device when the battery remaining capacity of the electronic device is smaller than the reference battery remaining capacity.

According to an embodiment of the present invention, the method further includes re-determining a power consumption level required for executing the program based on the battery remaining capacity of the electronic device when a reference range that includes the battery remaining capacity of the electronic device changes after the execution of the program.

According to an embodiment of the present invention, the determining of the power consumption level includes determining a power consumption level required for executing the program based on input information.

According to an embodiment of the present invention, the determining of the power consumption level includes determining a power consumption level required for executing the program based on a power consumption level of the program set by the input information and a basic power consumption level of the program.

According to an embodiment of the present invention, the executing of a program includes executing the program based on the power consumption level and the load on a system resource for the electronic device.

According to an embodiment of the present invention, the executing of the program may include: determining an additional power consumption level corresponding to the load on the system resource of the electronic device, and executing the program based on the additional power consumption level when the additional power consumption level is lower than the power consumption level.

According to an embodiment of the present invention, the executing of the program may include adjusting at least one among the performance of the processor used to execute the program on the basis of the power consumption level, the performance for graphic works, a haptic function, the number of frames, a resolution, a color palette quantization bit level, a bit quantization level of an audio signal, a frequency sampling level, an audio output level, or a brightness of a screen.

According to an embodiment of the present invention, the method further includes: determining, a second power consumption level required for executing a second program in response to an execution input of the second program during the execution of the program, and executing the second program based on the second power consumption level during the execution of the program based on the power consumption level.

According to an embodiment of the present invention, the executing of the second program may include executing the second program by using another window different from a window in which the program is executed.

According to various embodiments of the present invention, a method for controlling power in an electronic device may include: generating a plurality of windows; determining a different power consumption level required for executing a program in each window; and executing the program based on the different power consumption level in each window.

According to an embodiment of the present invention, the generating of the windows may include generating a plurality of windows such that the windows do not overlap each other.

According to an embodiment of the present invention, the generating of the plurality of windows may include overlapping one or more windows of the plurality of windows with each other.

According to an embodiment of the present invention, the determining of a power consumption level may include determining a power consumption level required for executing a program executed in each window based on the battery remaining capacity of the electronic device, input information, and a basic power level of the program executed in each window.

As described above, the present invention may apply a different power policy for each application program in the electronic device, so as to reduce the power consumption for an application program that does not require a high power use, and to increase a power use for an application requiring a high power, thereby increasing battery use efficiency.

Each of the above described elements of the electronic device according to various embodiments of the present invention may be formed of one or more components, and the name of a corresponding element may vary according to the type of an electronic device. The electronic device according to various embodiments of the present invention may include at least one of the above described elements and may exclude some of the elements or further include other additional elements. Further, some of the elements of the electronic device according to various embodiments of the present invention may be coupled to form a single entity while performing the same functions as those of the corresponding elements before the coupling.

The "module" used in various embodiments of the present invention may refer to, for example, a "unit" including one of hardware, software, and firmware, or a combination of two or more of the hardware, software, and firmware. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to various embodiments of the present invention may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (e.g., modules or functions thereof) or methods (e.g., operations) according to the various embodiments of the present invention may be implemented as, for example, an instruction stored in a computer readable storage medium in the form of a programming module. When the command is executed by one or more processors, the one or more processors may perform a function corresponding to the command. The computer-readable storage medium may be, for example, the memory 260. At least a part of the programming module may, for example, be implemented (e.g., executed) by a processor. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present invention, and vice versa.

Any of the modules or programming modules according to various embodiments of the present invention may include at least one of the above described elements, exclude some of the elements, or further include other additional elements. The operations performed by the modules, programming module, or other elements according to various embodiments of the present invention may be executed in a sequential, parallel, repetitive, or heuristic manner. Further, some operations may be executed according to another order or may be omitted, or other operations may be added.

Embodiments of the present invention provided in the present specifications and drawings are merely certain examples to readily describe the technology associated with embodiments of the present invention and to help understanding of the embodiments of the present invention, but may not limit the scope of the embodiments of the present invention. Therefore, in addition to the embodiments disclosed herein, the scope of the various embodiments of the present invention should be construed to include all modifications or modified forms drawn based on the technical idea of the various embodiments of the present invention.

The invention claimed is:

1. A method of an electronic device, the method comprising:
    displaying, through a display of the electronic device, a user interface (UI) of an application being executed;
    while displaying the UI, detecting a drag input directed from an edge area of the display toward an area of the display different from the edge area;
    in response to detecting the drag input, displaying, through the display, a control menu superimposed on the UI of the application, the control menu including a first object for manually configuring a power consumption level of the application and a second object for automatically configuring the power consumption level of the application;
    based on receiving an input on the first object included in the control menu while the second object is in a first state, changing the power consumption level of the application based on the input on the first object;
    based on receiving an input for switching a state of the second object from the first state to a second state, determining a remaining battery capacity of the electronic device and changing the power consumption level of the application based on the remaining battery capacity; and
    based on the changed power consumption level, changing a representation of the UI.

2. The method of claim 1, wherein the changing the power consumption level comprises:
    based on the changed power consumption level, changing frame per second (FPS) used for displaying the UI of the application; and
    based on the changed FPS, changing the representation of the UI.

3. The method of claim 1, wherein the changing the power consumption level comprises:
    based on the changed power consumption level, changing a resolution of the UI; and
    based on the changed resolution, changing the representation of the UI.

4. The method of claim 1, wherein the changing the power consumption level comprises:
    based on the changed power consumption level, a color palette quantization bit level; and
    based on the changed color palette quantization bit level, the representation of the UI.

5. The method of claim 1, wherein the control menu further includes one or more of an object for configuring a brightness of the display, an object for activating a wireless-fidelity (Wi-Fi) function, or an object for activating a Bluetooth function.

6. The method of claim 5, wherein the first object for manually configuring a power consumption level of the application is displayed with a bar capable of controlling the power consumption level of the application according to a user input.

7. The method of claim 1, further comprising:
    detecting an input for executing another application; and
    in response to the detecting the input for executing the another application, displaying, through the display, another UI of the another application based on another power consumption level.

8. The method of claim 7, wherein the another power consumption level of the another application is determined based on the remaining battery capacity, independently of the changed power consumption level of the application.

9. The method of claim 7, wherein the another power consumption level of the another application is determined based on a load on a system resource for the electronic device, independently of the changed power consumption level of the application.

10. The method of claim 1, further comprising:
    based on the changed power consumption level, deactivating a haptic function.

11. The method of claim 1, further comprising:
    based on the changed power consumption level, changing an output level of an audio outputted based on an execution of the application.

12. The method of claim 1, wherein, while the second object is in the second state, the method further comprises:
    determining a dynamic power level of the application based on a system load of the electronic device;
    determining whether the dynamic power level is smaller than the power consumption level of the application;
    when the dynamic power level is smaller than the power consumption level of the application, changing the representation of the UI according to the dynamic power level; and
    when the dynamic power level is larger than or equal to the power consumption level of the application, changing the representation of the UI according to the power consumption level of the application.

13. An electronic device comprising:
    a display;
    a chargeable battery;
    a processor; and
    a memory operably coupled to the processor,
    wherein the memory stores instructions that, when executed, cause the processor to:
        control the display to display, through the display, a user interface (UI) of an application being executed;
        while displaying the UI, detect a drag input directed from an edge area of the display toward an area of the display different from the edge area;
        in response to detecting the drag input, control the display to display, through the display, a control menu superimposed on the UI of the application, the control menu including a first object for manually configuring a power consumption level of the application and a second object for automatically configuring the power consumption level of the application;

based on receiving an input on the first object included in the control menu while the second object is in a first state, change the power consumption level of the application based on the input on the first object;

based on receiving an input for switching a state of the second object from the first state to a second state, determine a remaining battery capacity of the chargeable battery and change the power consumption level of the application based on the remaining battery capacity; and based on the changed power consumption level, change a representation of the UI.

14. The device of claim 13, wherein the memory stores further instructions that, when executed, cause the processor to:

based on the changed power consumption level, change frame per second (FPS) used for displaying the UI of the application; and based on the changed FPS, change the representation of the UI.

15. The device of claim 13, wherein the memory stores further instructions that, when executed, cause the processor to:

based on the changed power consumption level, change a resolution of the UI; and based on the changed resolution, change the representation of the UI.

16. The device of claim 13, wherein the memory stores further instructions that, when executed, cause the processor to:

based on the changed power consumption level, change a color palette quantization bit level; and based on the changed color palette quantization bit level, change the representation of the UI.

17. The device of claim 13, wherein the control menu further includes one or more of an object for configuring a brightness of the display, an object for activating a wireless-fidelity (Wi-Fi) function, or an object for activating a Bluetooth function.

18. The device of claim 17, wherein the first object for manually configuring a power consumption level of the application is displayed with a bar capable of controlling the power consumption level of the application according to a user input.

19. The device of claim 13, wherein the memory stores further instructions that, when executed, further cause the processor to:

detect an input for executing another application; and in response to the detecting the input for executing the another application, control the display to display another UI of the another application based on another power consumption level.

20. The device of claim 19, wherein the another power consumption level of the another application is determined based on the remaining battery capacity, independently of the changed power consumption level of the application.

21. The device of claim 19, wherein the another power consumption level of the another application is determined based on a load on a system resource for the electronic device, independently of the changed power consumption level of the application.

22. The device of claim 13, wherein the memory stores further instructions that, when executed, further cause the processor to based on the changed power consumption level, deactivate a haptic function.

23. The device of claim 13, wherein the memory stores further instructions that, when executed, further cause the processor to based on the changed power consumption level, change an output level of an audio outputted based on an execution of the application.

24. The device of claim 13, wherein while the second object is in the second state, the memory stores further instructions that, when executed, cause the processor to:

determine a dynamic power level of the application based on a system load of the electronic device;

determine whether the dynamic power level is smaller than the power consumption level of the application;

when the dynamic power level is smaller than the power consumption level of the application, change the representation of the UI according to the dynamic power level; and when the dynamic power level is larger than or equal to the power consumption level of the application, change the representation of the UI according to the power consumption level of the application.

* * * * *

UNITED STATES PATENT AND TRADEMARK OFFICE
CERTIFICATE OF CORRECTION

PATENT NO. : 10,203,739 B2  
APPLICATION NO. : 14/914083  
DATED : February 12, 2019  
INVENTOR(S) : Sang-Won Chae et al.

Page 1 of 1

It is certified that error appears in the above-identified patent and that said Letters Patent is hereby corrected as shown below:

In the Claims

Column 21, Claim 4, Line 66 should read as follows:  
--...level, changing a color...--  
Column 22, Claim 4, Lines 1-2 should read as follows:  
--...level, changing the representation...--

Signed and Sealed this  
Twenty-sixth Day of March, 2019

Andrei Iancu  
*Director of the United States Patent and Trademark Office*